United States Patent [19]

Miyairi et al.

[11] Patent Number: 5,333,369
[45] Date of Patent: Aug. 2, 1994

[54] METHOD AND APPARATUS FOR POSITIONING DIES

[75] Inventors: Kazuki Miyairi; Akira Iijima, both of Sakakimachi, Japan

[73] Assignee: Nissei Plastic Industrial Co., Ltd., Japan

[21] Appl. No.: 26,514

[22] Filed: Mar. 4, 1993

[30] Foreign Application Priority Data

Mar. 5, 1992 [JP]  Japan .................. 4-083101
Mar. 5, 1992 [JP]  Japan .................. 4-083102

[51] Int. Cl.$^5$ ............... B23Q 3/00; B29C 33/20
[52] U.S. Cl. .................................... 29/405; 29/465; 29/468; 29/281.5; 425/186; 425/190; 425/451.9
[58] Field of Search ............. 29/281.5, 405, 465, 29/468; 425/186, 451.9, 190

[56] References Cited

U.S. PATENT DOCUMENTS

| | | | |
|---|---|---|---|
| 3,332,308 | 7/1967 | Keen .................. | 29/465 |
| 3,663,136 | 5/1972 | Westermann .......... | 425/186 |
| 3,742,568 | 7/1973 | Hahlbeck ............. | 29/281.5 |
| 3,744,950 | 7/1973 | Courtois ............. | 425/186 |
| 4,439,123 | 3/1984 | Sano et al. .......... | 425/186 |
| 4,472,128 | 9/1984 | Ruhl ................. | 425/186 |
| 4,971,548 | 11/1990 | Asai ................. | 425/588 |
| 5,096,404 | 3/1992 | Janos et al. ......... | 425/451.9 |
| 5,108,278 | 4/1992 | Tsutsami et al. ...... | 425/186 |
| 5,139,411 | 8/1992 | Polacinski ........... | 425/556 |

OTHER PUBLICATIONS

Plastverarbeiter, deel 42, nr. 7, Juli 1911, Speyer de Bladzijden 88–90 XP000259146 "Schnellspannsystem Gibt Hohe Stabilität und Funktionssicherheit".

Primary Examiner—Jay H. Woo
Assistant Examiner—Robert B. Davis
Attorney, Agent, or Firm—Ostrolenk, Faber, Gerb & Soffen

[57] ABSTRACT

A method for positioning both dies set to both movable and stationary platens of a plastic molding machine to form a cavity by fitting convex and concave portions formed on the facing surfaces of the dies into a spigot respectively, wherein a movable die is set to the movable platen at the retreat position to secure the movable die to the home position and a stationary die is temporarily clamped at the home position of the stationary platen by pressing the stationary die in the lateral direction by a repulsive member, the movable die is advanced against the stationary die under the above state, die matching of the stationary and movable dies is performed by fitting the convex portion to the concave portion, and thereby positioning of the stationary die is performed by correcting the position of the die before permanently clamping the stationary die to the stationary platen under the state in which the both dies are fastened by the movable platen. Thereby, positioning of high-accuracy dies with a small clearance of the fitting portion can be easily performed.

9 Claims, 3 Drawing Sheets

METHOD AND APPARATUS FOR POSITIONING DIES

BACKGROUND OF THE INVENTION

1. Field of the Invention

The present invention relates to a method for positioning the dies set to a stationary platen and a movable platen of a plastic molding machine such as an injection molding machine and a temporarily clamping apparatus used for the method.

2. Background Art

In general, one of the dies is set to a movable platen before the other is set to a stationary platen. The die is secured to the stationary platen with bolts at four places or by setting clamps at four places: right and left and top and bottom of a die mounting plate, one each, and fastening the die with the clamps.

Even when the dies are secured to their home position, imperfect die closing may occur due to a slight deviation between the dies. Therefore, it is necessary to perform the positioning of the dies before setting them.

The positioning is performed for the die of the stationary platen side. In most cases, the positioning is performed by slightly loosening the bolts or clamps securing the die and temporarily setting the die to the home position to provide the die with a margin in the lateral direction before performing die matching.

For the above positioning method, however, it is difficult to adjust the die fastening degree. If the fastening for temporary setting is insufficient, die matching is difficult because the die is deviated extremely lower than the home position. If the fastening is excessive, the die easily moves in the lateral direction. Therefore, galling occurs due to imperfect die matching and the die may be broken in the worst case.

Especially for a die to be closed by fitting the straight surface of it to a spigot, a clearance is provided to prevent the fitting portion from being abraded when the die is opened or closed. For the existing method, however, positioning is very troublesome and requires a long time because the clearance is very small. Therefore, for a small volume production requiring frequent replacement of dies, there is a problem in that the positioning causes the productivity to decrease.

SUMMARY OF THE INVENTION

The present invention solves the above existing problem and provides a new method for positioning both dies which simplifies positioning by elastically and temporarily clamping a stationary die in the lateral direction.

The present invention also provides a method for positioning both dies which eliminates the positional deviation for die closing due to the clearance at a fitting portion by temporarily removing the clearance.

The present invention also provides a method for positioning both dies which can also be used to position the dies for molding a compact disk.

The present invention is a method for positioning both dies for plastic molding which are set to a movable platen of a plastic molding machine as a movable die and a stationary platen of the machine as a stationary die respectively to form a cavity by fitting convex and concave portions formed on the facing surfaces of the dies into a spigot respectively, in which the movable die is set to the movable platen at the retreat position to secure it to the home position, the stationary die is temporarily clamped at the home position on the stationary platen by pressing the stationary die in the lateral direction by a repulsive member, the movable platen is advanced against the stationary platen while the stationary die is temporarily clamped at the home position, die matching is performed between the stationary and movable dies by fitting the convex portion to the concave portion, and the stationary die is positioned according to the die matching before the stationary die is permanently clamped to the stationary platen while the dies are fastened by the movable platen.

The stationary die is temporarily clamped at the home position with a temporarily clamping apparatus set to tie bars located at the top and bottom of the lateral side of the stationary platen while making a clamping member, pressed outward by a coil spring stored in the temporarily clamping apparatus, contact the lateral side of the stationary die inserted between top and bottom clamps, which also serve as guides of the stationary platen side, and pressing the stationary die against a die catching member at the side by the coil spring.

The cavity formed between the facing surfaces of the movable and stationary dies is circular and has a stamper at one of the die faces and a heating medium path inside.

The stationary die has a coupler serving as a doorway of the heating medium path formed inside at one side and a rod-shaped handle parallel with the lateral side at the other side, in which a clamping member of the temporarily clamping apparatus is contacted to the handle and pressed against the die catching member of the lateral side. An O-ring set at the periphery of the coupler is contacted to the die catching member by the above pressure and the stationary die is elastically held by the temporarily clamping apparatus and the die catching member due to the elastic force of the O-ring and the repulsive force of the coil spring so that it is temporarily clamped.

The positioning of the stationary and movable dies according to the die matching is performed after the temperature of the dies reaches the molding temperature and permanent clamping of the stationary die after positioning is performed after eliminating the clearance of the fitting portion of the dies by thermal expansion of the stationary die whose temperature reaches the molding temperature or higher.

The temperature of the stationary die before positioning according to die matching is raised by passing the heating medium through the stationary die before or after temporarily clamping the stationary die to the stationary platen.

The temporarily clamping apparatus for positioning is provided with a mounting member having horizontal holes at the ends and comprises a predetermined-length seating plate with a tapped hole at its center, a guide case secured in the seating plate, an operating rod with a handle screwed to the tapped hole and rotatably set outside the seating plate, a movable clamping member secured to the end of the operating rod with a bolt and stored in the guide case, and a spring member set between the clamping member and operating rod to always press the clamping member outward.

The bolt connecting the clamping member with the operating rod is screwed to a core secured in the operating rod, and the coil spring for pressing the clamping member outward is set around the connecting bolt by making one end of the spring contact the clamping member and the other end of it contact the operating rod.

For the present invention, because the stationary die has flexibility in the lateral direction due to temporary clamping, the deviation of the die fitting position is corrected in the process of die matching after temporary clamping and the stationary die can be positioned through temporary clamping.

When the stationary die is permanently clamped to the stationary platen by performing die closing after die matching, the position becomes the home position and the positional adjustment for permanent clamping is unnecessary. If a stationary die deviation equivalent to a clearance may occur during permanent clamping, the clearance is eliminated because the outside diameter of the stationary die increases due to thermal expansion caused at the fitting portion of the stationary die by the heating medium heated by the temperature rise of the stationary die, and the stationary die is held by the movable die and brought under the immovable state.

Because the stationary die is not deviated at all under the above immovable state, it is not deviated during permanent clamping and the clearance can be accurately reproduced according to the temperature drop after permanent clamping. Therefore, even a very small clearance can be secured and no friction occurs in the fitting portion even if die closing is performed by a straight spigot.

As a result, it is possible to easily position a die with a small clearance of the fitting portion and open/close the die under a set clearance. Therefore, the service life of the die increases.

BRIEF DESCRIPTION OF THE DRAWINGS

The drawings show embodiments of the method for positioning both dies and the temporarily clamping apparatus used for the method according to the present invention.

DETAILED DESCRIPTION OF THE PREFERRED EMBODIMENTS

Figure 1:
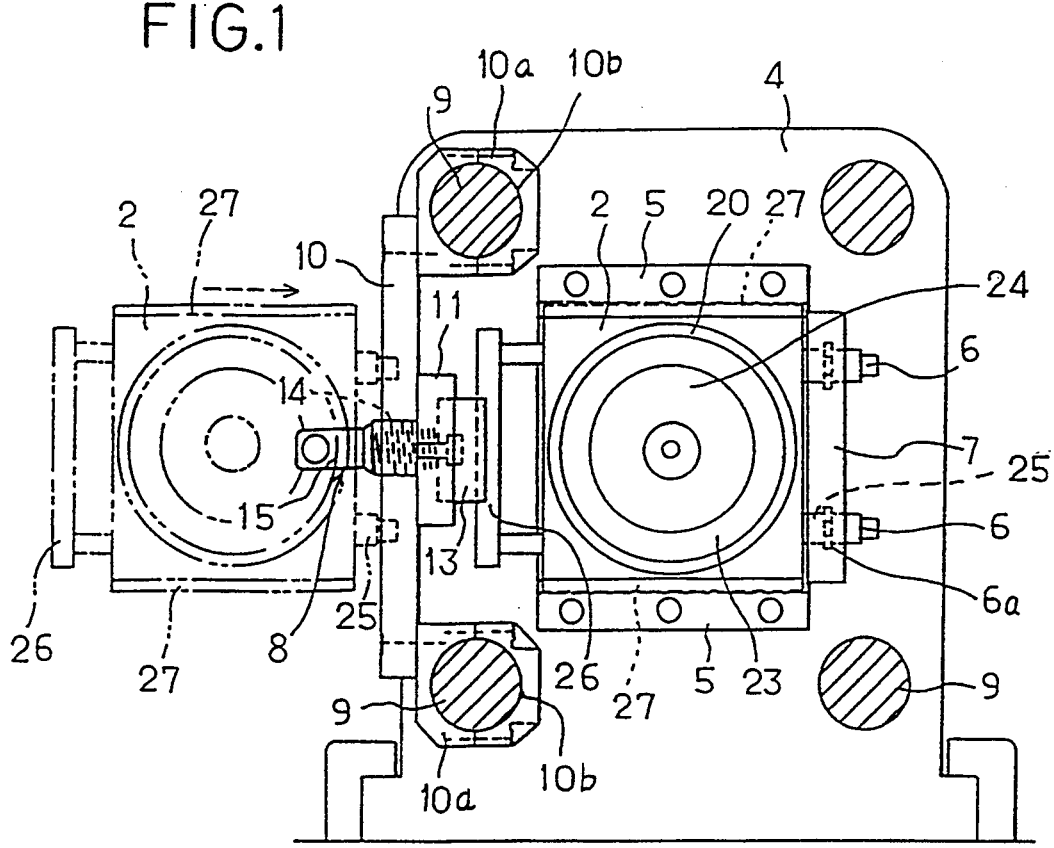
FIG. 1 is a front view of the stationary platen of a molding machine when a stationary die is temporarily clamped.

The present invention is described below in detail by taking injection dies for molding a compact disk (CD) as an example.

In Figures, symbol 1 is a movable die and 2 is a stationary die. The movable 1 and the stationary die 2 are set to a movable platen 3 and stationary platen 4 of a locking device with the normal structure respectively.

Figure 2:
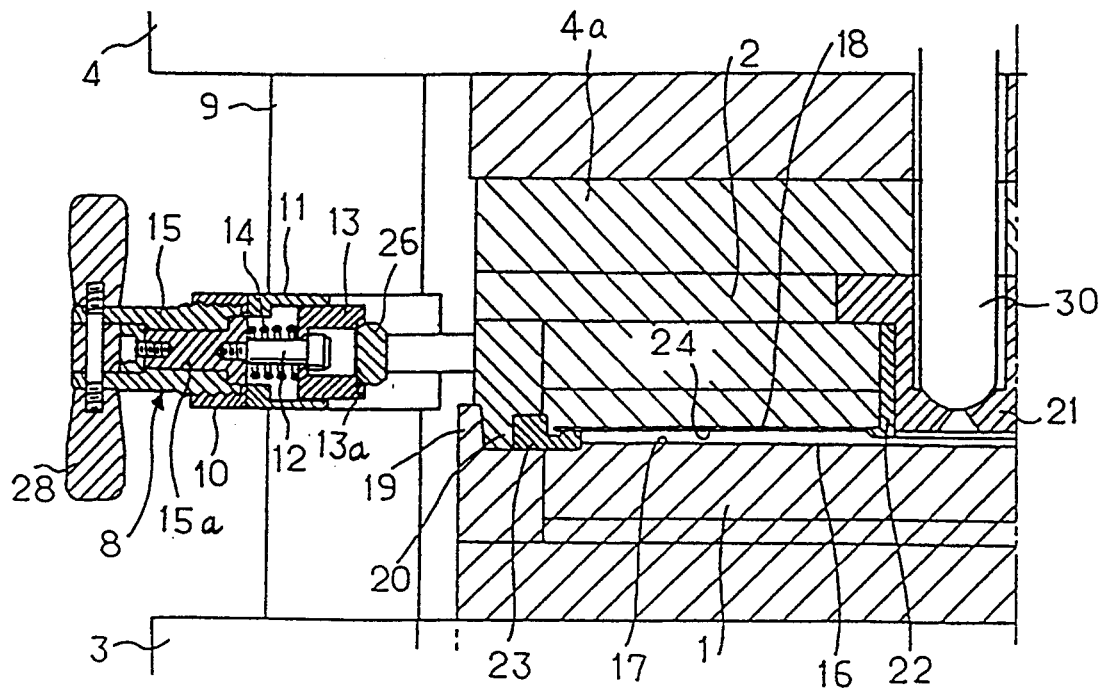
FIG. 2 is an enlarged plane sectional view of the half of the stationary platen.

The stationary platen 4 has parallel oblong clamps 5 also serving as guide plates at the top and bottom of a die mounting plate 4a (shown in FIG. 2) formed on the inner surface of the stationary platen 4 respectively so that the stationary die 2 can be inserted between the clamps 5 from the side. Moreover, a die catching member 7 made of a longitudinal block penetrated by a temperature controlling coupler 6 into which a coupler protruded at one side of the stationary die 2 is inserted is set at the receiving side (right side in FIG. 1) inside the stationary platen 4.

A temporarily clamping apparatus 8 is set to the opposite side of the die catching member 7 by passing it through the top and bottom die bars 9 and 9 whose one ends are connected to the stationary platen 4.

The temporarily clamping apparatus 8 is set to a thick-wall seating plate 10 formed slightly longer than the tie bar interval to whose both sides a block-shaped mounting member 10a is secured. The mounting member 10a comprises a pair of split members combined by a bolt and having a semicircular concave portion which forms a horizontal hole 10b to be fitted to a tie bar 9 and top and bottom shaft members (not illustrated) protruded on the stationary platen.

A tapped hole 10c is drilled at the center of the seating plate 10 and a guide case 11 is vertically secured to the inside of the seating plate on which the tapped hole 10c opens. A block-shaped clamping member 13 in which a clamp groove 13a is longitudinally formed is stored in the guide case, which is connected with the end of the operating rod 15 screwed into the tapped hole 10c and movably set to the outside of the seating plate by a bolt 12.

The bolt 12 connecting the clamping member 13 with the operating rod 15 is screwed to a core 15a secured in the operating rod and a coil spring 14 is set around the connection bolt so that one end of the spring contacts the clamping member and the other end of it contacts the operating rod. The clamping member 13 is constantly pressed outward by the coil spring 14.

The facing surfaces of the movable die 1 and stationary die 2 are formed into convex and concave portions respectively fitted to a spigot to form a cavity. A cavity 16 for molding a CD is formed by a circular convex portion 17 formed on the facing surface of the movable die 1 and a circular concave portion 18 formed on the facing surface by leaving a fitting margin 20 in the concave portion 18 surface fitted into a margin 19 of the convex portion 17.

A sprue bush 21 and an internal stamper holder 22 are concentrically set at the center of the concave portion 18 and an injection nozzle 30 contacts the sprue bush 21 passing through the stationary platen 4 and die mounting plate 4a.

Moreover, an annular external stamper holder 23 is fitted to the margin of the concave portion 18 and a stamper 24 is secured to the bottom of the concave portion 18 by the stamper holders 22 and 23.

The inner surface of the margin 19 of the convex portion 17 and the outer surface of the fitting margin of the concave portion 18 are formed straight and both make contact upon die closing under the spigot state. To prevent the friction in die opening or closing, a predetermined clearance (e.g. 10 μm) is formed between the surfaces.

Paths (not illustrated) for a heating medium are formed in the movable die 1 and stationary die 2 similarly to a normal die. The stationary die 2 has a coupler 25 provided with an O-ring 6a at its margin and serving as a doorway of the path at one side. At the opposite side, it has a rod-shaped handle 26 parallel with the side so that the stationary die 2 can be temporarily clamped by making the clamp 13 of the temporarily clamping apparatus 8 contact the handle 26.

It is also possible to set the O-ring 6a to the inner periphery of the temperature controlling coupler 6 at the die catching member side.

Figure 3A:
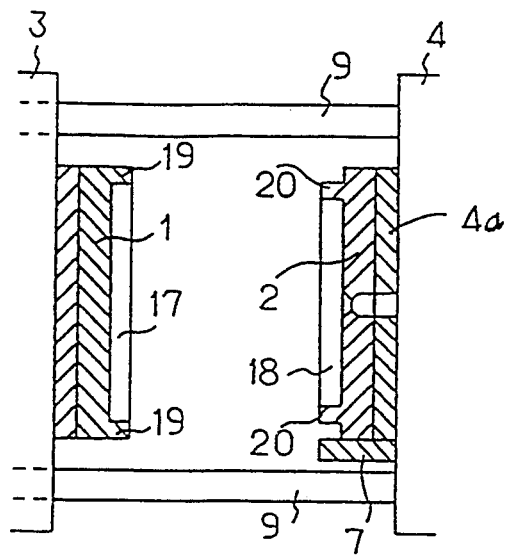
FIGS. 3 (A) and 3 (B) are schematic plane sectional views for explaining the positioning of both dies.
Figure 3B:
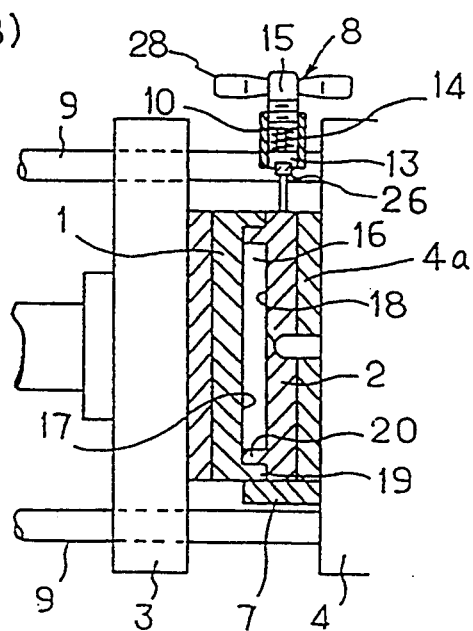
Figure 4:
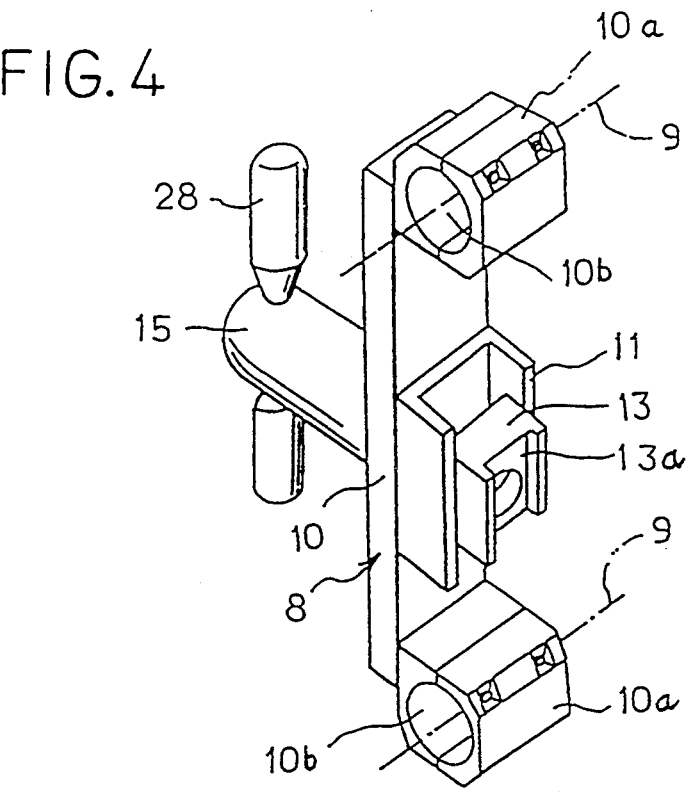
FIG. 4 is a perspective view of a temporarily clamping apparatus.
Figure 5:
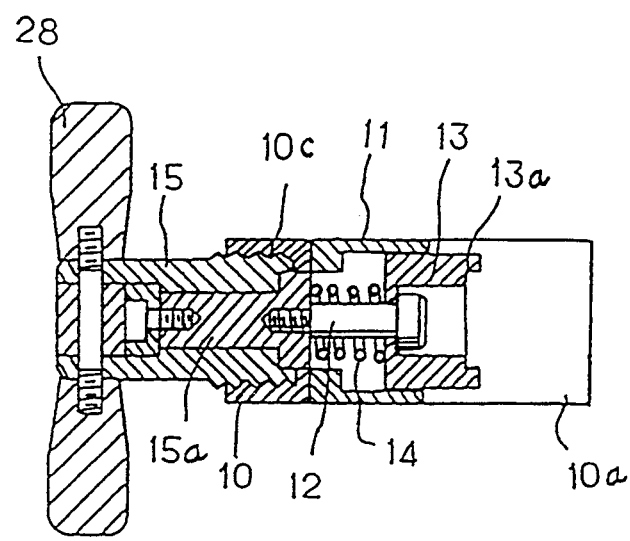
FIG. 5 is a plane sectional view of the central portion of a temporarily clamping apparatus.

The die positioning method is described below by referring to FIGS. 3 (A) and 3 (B). First, the temporarily clamping apparatus 8 is secured to the top and bottom tie bars 9 and 9 by passing it through the mounting members 10a and 10a and moved to the side of the stationary platen 4. The top and bottom clamps 5 and 5 of the stationary platen are kept slightly fastened.

Then, under the die opening state after the movable platen 3 retreats, the movable die 1 is secured to the home position of the movable platen 3. Then, the stationary die 2 is set to the stationary platen 4 by inserting the stationary die 2 to the gap between the top and bottom clamps 5 and 5 of the die mounting plate 4a from the side to which the temporarily clamping apparatus 8 of the stationary platen 4 is previously moved to fit a level-difference portion 27 of the top and bottom margins of the die into the clamps 5 and 5 and pushing the insertion side up until it approaches the die catching member 7.

After the stationary die 2 is set to the home position of the stationary platen 4, the temporarily clamping apparatus 8 is returned to the side of the stationary die 2 by sliding the tie bars 9 and 9, the clamp operating rod 15 is rotated by the handle 28 to make the clamp 13 contact the handle 26, and the coil spring 14 is properly compressed to press the stationary die 2 against the die catching member 7. In this case, it is preferable that the pressure balances with the reactive force for fitting of the couplers 6 and 25 and properly compresses the O-ring 6a.

Thereby, the stationary die joints with the couplers 6 and 25 of the die catching member through the O-ring 6a, the temperature of the stationary die 2 can be raised by the heating medium, and the stationary die 2 is temporarily clamped at the home position of the stationary platen 4 by being elastically held by the die catching member 7 and temporarily clamping apparatus 8.

While the stationary die 2 is temporarily clamped, the movable die 1 is heated up to the molding temperature (e.g. 90° C.). The stationary die 2 is also heated to the same temperature of the movable die 1. In this case, it is possible to use either the method for previously heating the stationary die 2 up to the molding temperature or the method for heating it by the heating medium after insertion.

After the die temperature is adjusted, the die matching of the movable die 1 and stationary die 2 is performed by advancing the movable platen 3. In this case, the stationary die 2 temporarily clamped by being elastically held has flexibility in the lateral direction and also in the vertical direction due to the slight fastening force of the clamps 5 and 5. Therefore, while the fitting margin 20 of the stationary die 2 serving as a concave portion is set in the margin 19 of the convex portion 17, a very small deviation of the fitting position is corrected because the stationary die is naturally moved due to the pressure in fitting, the fitting margin 20 is fitted into the margin 19 of the convex portion 17, and the home position of the stationary die 2 is decided.

After the position is decided by the die matching, both dies are fastened by the movable platen 3 and, at the same time, the stationary die 2 is permanently clamped to the stationary platen 4. However, because the stationary die may be deviated by a distance equivalent to the clearance during permanent clamping, the permanent clamping is performed by eliminating the clearance.

Elimination of the clearance is performed by using thermal expansion. When the temperature of the stationary die is raised by approx. 10° C. from the die temperature (90° C.) by the heating medium after die matching, the outside diameter of the fitting margin 20 serving as a convex portion is increased due to the thermal expansion caused by the temperature rise, the above clearance is eliminated, and inner periphery of the convex portion 17 closely contacts the outer surface of the fitting margin 20. Thereby, the stationary die 2 is held by the movable die 1 and brought under the immovable state.

Under the above state, no slight deviation of the stationary die 2 occurs. Therefore, the stationary die 2 is permanently clamped to the stationary platen 4 by keeping the state. The permanent clamping can be easily performed by securing the clamp 5 to the stationary platen 4. After the permanent clamping is completed, temporary clamping is released to remove the temporarily clamping apparatus 8 from the tie bar 9 or move it to the stationary platen side for next-time die replacement.

When the stationary die 2 is cooled up to the molding temperature after the permanent clamping is completed, a clearance is produced again due to shrinkage. Therefore, because die opening/closing is performed by the clearance, no friction occurs even if die closing is performed by a straight spigot.

Though the temporarily clamping apparatus 8 is set to the tie bar 9, it is also possible to set it to top and bottom support bars protruded on the side of the stationary platen 4.

The cavity shape is not restricted to the illustrated one. Because the present invention can be applied to every die performing die closing by a spigot, it is not restricted only to CD molding dies.

What is claimed is:

1. A method for positioning dies on a plastic molding machine, one of said dies being a movable die mounted on a movable platen and the other of said dies being a stationary die mounted on a stationary platen, the movable and stationary dies being mounted to form a cavity therebetween by fitting a convex portion of the stationary die into a concave portion of the movable die formed on the facing surfaces of the dies into spigots, respectively, the method comprising the steps of:

securing the movable die in a home position on the movable platen with the movable platen at a retreat position;

temporarily clamping the stationary die at a home position on the stationary platen by pressing the stationary die in a lateral direction by a repulsive member of a temporarily clamping apparatus;

die matching the stationary and movable dies by advancing the movable platen against the stationary platen and fitting the convex portion of the movable die to the concave portion of the stationary die; and positioning the stationary die according to the die matching before permanently clamping the stationary die to the stationary platen while both dies are fastened together by the movable platen, wherein the stationary die has a coupler on a first side serving as a doorway of a heating medium path, and a rod-shaped handle on a second side parallel with and opposite to the first side, and a clamping member of the temporarily clamping apparatus is contacted to the handle and pressed against a die catching member at the first side.

2. A method for positioning dies according to claim 1, wherein the step of temporarily clamping the stationary die to the home position is performed by using the temporarily clamping apparatus set to tie bars located at a top and bottom of the second side of the stationary platen, making the clamping member, pressed outward by a coil spring stored in the temporarily clamping apparatus, contact the second side of the stationary die inserted into a gap between top and bottom clamps serving as guides on the stationary platen, and pressing the stationary die against the die catching member at the first side with the coil spring.

3. A method for positioning both dies according to claim 1, wherein the coupler has an O-ring contacting the die catching member at its margin and the stationary die is temporarily clamped by being elastically held by the temporarily clamping apparatus and the die catching member.

4. A method for positioning dies on a plastic molding machine, one of said dies being a movable die mounted on a movable platen, the other of said dies being a stationary die mounted on a stationary platen, the movable and stationary dies being mounted to form a cavity therebetween by fitting a convex portion of the stationary die into a concave portion of the movable die, the method comprising the steps of:

securing the movable die in a home position to the movable platen with the movable platen at a retreat position;

temporarily clamping the stationary die at a home position on the stationary platen by pressing the stationary die in a lateral direction by a repulsive member of the temporarily clamping apparatus;

die matching the stationary and movable dies by advancing the movable platen against the stationary platen and fitting the convex portion to the concave portion; and positioning the stationary die according to the die matching before permanently clamping the stationary die to the stationary platen, while both dies are fastened together by the movable platen;

wherein the step of positioning the stationary die according to the die matching is performed after heating the dies to a molding temperature and permanent clamping of the stationary die after positioning is performed upon eliminating a clearance at a fitting portion of the dies by thermal expansion of the stationary die produced by heating the stationary die to the molding temperature or higher.

5. A method for positioning dies according to claim 4, wherein temperature rise of the stationary die before positioning according to die matching is performed before temporarily clamping the stationary die to the stationary platen.

6. A method for positioning dies according to claim 4, wherein temperature rise of the stationary die before positioning according to die matching is performed by passing a heating medium through the stationary die after temporarily clamping the stationary die to the stationary platen.

7. A method for positioning dies according to claim 1, wherein the cavity formed between the facing surfaces of movable and stationary dies is circular and has a stamper on one of the die faces.

8. A temporarily clamping apparatus for positioning both dies provided with a mounting member having a horizontal hole at the both ends of it, comprising a predetermined-length seating plate on which center a tapped hole is drilled, a guide case secured to the inside of the seating plate, an operating rod with a handle screwed into the tapped hole and rotatably set to the outside of the seating plate, a rotatable clamping member secured to the end of the operating rod by a bolt and stored in the Guide case, and a spring member set between the clamping member and the operating rod to constantly press the clamping member outward.

9. A temporarily clamping apparatus for positioning both dies according to claim 8, wherein a bolt for connecting a clamping member with an operating rod is screwed to a core secured in the operating rod and a coil spring for pressing the clamping member outward is set around the connection bolt so that one end of the spring contacts the clamping member and the other end of it contacts the operating rod.

* * * * *